United States Patent [19]
Furukawa et al.

[11] Patent Number: 4,689,672
[45] Date of Patent: Aug. 25, 1987

[54] METHOD AND DEVICE OF CODING A DIGITAL VIDEO SIGNAL FOR REPRODUCTION OF PICTURES WITH A HIGH QUALITY EVEN UPON OCCURRENCE OF A DRASTICAL CHANGE BETWEEN THE PICTURES

[75] Inventors: Akihiro Furukawa; Junichi Ohki, both of Tokyo, Japan

[73] Assignee: NEC Corporation, Tokyo, Japan

[21] Appl. No.: 907,272

[22] Filed: Sep. 15, 1986

[30] Foreign Application Priority Data

Sep. 13, 1985 [JP] Japan ............................. 60-203837
Dec. 4, 1985 [JP] Japan ............................. 60-273937
Jul. 30, 1986 [JP] Japan ............................. 61-181076

[51] Int. Cl.⁴ ......................................... H04N 7/137
[52] U.S. Cl. ................................... 358/136; 358/105
[58] Field of Search ............... 358/133, 135, 136, 105

[56] References Cited

U.S. PATENT DOCUMENTS

| | | | |
|---|---|---|---|
| 4,460,923 | 7/1984 | Hirano | 358/136 |
| 4,494,144 | 1/1985 | Brown | 358/133 |
| 4,575,756 | 3/1986 | Furukawa | 358/136 |
| 4,591,907 | 5/1986 | Catros | 358/136 |
| 4,636,862 | 1/1987 | Hatori | 358/105 |

Primary Examiner—Howard W. Britton
Attorney, Agent, or Firm—Sughrue, Mion, Zinn, Macpeak & Seas

[57] ABSTRACT

On subjecting a digital video signal representative of successive pictures to predictive coding by using correlation between two successive pictures, an estimated result is derived from the digital video signal to represent a degree of correlation between a current picture and a previous picture and is increased with a reduction of the degree. When the estimated result becomes greater than a predetermined threshold value as a result of a drastical change, such as a scene change, from the previous picture to the current picture, a control signal is produced. Furthermore, the digital video signal is separated into a preceding signal part ending at the previous picture and a succeeding part which begins at the current picture. The control signal controls the predictive coding so that the succeeding part be coded with an area of predictive coding of each picture gradually widened with time. The control signal may be supplied to a predictive coder. Alternatively, the control signal may be used to control a frame memory for supplying the digital video signal to the predictive coder with the area gradually widened for the succeeding part. A plurality of threshold levels may be used collectively as the predetermined threshold. The threshold levels are for use in selecting a rate of gradually widening the area.

10 Claims, 13 Drawing Figures

METHOD AND DEVICE OF CODING A DIGITAL VIDEO SIGNAL FOR REPRODUCTION OF PICTURES WITH A HIGH QUALITY EVEN UPON OCCURRENCE OF A DRASTICAL CHANGE BETWEEN THE PICTURES

BACKGROUND OF THE INVENTION

This invention relates to a method of coding a digital video signal representative of successive pictures into a coded signal by the use of correlation between two successive ones of the pictures. This invention relates also to a coding device for use in carrying out the method.

Each of the successive pictures may correspond to a frame of the digital video signal when the digital video signal is, for example, a digital television signal. On transmitting the digital video signal as transmission data, it is known in the art that an interframe predictive coding method is effective to achieve data compression of the transmission data and to thereby reduce the amount of the transmission data to be transmitted. The interframe predictive coding method makes use of correlation between two successive ones of successive frames. More particularly, a difference is at first calculated between corresponding picture elements of two successive pictures. Such differences are coded into a coded signal which represents the transmission data and is received as reproduced pictures. The difference will be called an interframe difference.

The interframe predictive coding method is, however, defective in that the reproduced pictures become to have a poor quality when the high compression is retained even for pictures which include a movement. This is because the difference becomes large as a result of a decrease in the correlation between the two successive pictures.

In order to remove the defect, an improved method is proposed which is called a motion-compensated interframe coding method. In the improved method, each of the successive pictures is divided into a predetermined number of blocks of picture elements. As will later be described more in detail, a motion vector is detected which represents a movement of each block between two successive pictures. By using the motion vector, prediction is carried out with a high accuracy. This renders the difference small between the picture elements of the two successive pictures which include the movement. The improved method is disclosed, for example, by Tatuso ISHIGURO and Kazumoto IINUMA in an IEEE Communications Magazine, November 1982, pages 24-30, under the title of "Television Bandwidth Compression Transmission by Motion-compensated Interframe Coding."

However, the improved method is still defective in that the amount of the transmission data becomes large when a drastical or large change, such as a scene change, occurs between the two successive pictures. This is because the correlation between two successive pictures is possessed of an extremely lower degree of correlation when the drastical change occurs.

The amount of transmission data could be reduced if the high compression were retained even when the drastical change occurs. In order to reduce the amount of the transmission data, the digital video signal should be subjected to a rough coding method in the manner which will presently be described. On applying a rough coding method to the digital video signal, it is possible to use a rough quantization step on quantizing the digital video signal or to delete either a field or a frame of the digital video signal. It is also possible for a worst case to suspend coding the digital video signal at an intermediate part of the picture. When the rough quantization step or deletion of the field or the frame is carried out, the reproduced pictures inevitably have a low quality. When coding the digital video signal is suspended, freezing may occur in the reproduced picture. More specifically, each of such reproduced pictures may have an upper already coded area in combination with a remaining area which is not yet coded. The upper area corresponds to an upper portion of a new picture. The remaining area corresponds to a lower area of a previous picture. The freezing continues a predetermined time duration of, for example, 0.3 seconds. Inasmuch as the freezing continues an appreciably long time duration, the freezing is eyesore to viewers. Thus, suspension of coding the digital video signal also results in a reduction of the quality of the reproduced picture.

SUMMARY OF THE INVENTION

It is therefore an object of this invention to provide a method of coding a digital video signal, whereby pictures can be reproduced with a high quality even when a drasical change occurs between two successive pictures.

It is another object of this invention to provide a method of the type described, whereby pictures can be reproduced without occurrence of freezing which is eyesore to viewers.

Other objects of this invention will become clear as the description proceeds.

A method to which this invention is applicable is for coding a digital video signal into a coding signal. The digital video signal is representative of successive pictures. The method includes a predictive coding step of predictively coding the digital video signal to produce the coded signal by using correlation between two successive ones of the successive pictures. According to this invention, the method comprises the steps of: estimating a degree of correlation between a current picture and a previous picture to produce an estimated result representative of the degree of correlation, the current picture next succeeding the previous picture among the successive pictures; comparing the estimated result with a predetermined threshold value to produce a control signal with reference to a relationship between the estimated result and the predetermined threshold value; and controlling the predictive coding step in response to the control signal to separate from the digital video signal a succeeding part beginning at the current picture and to make the predictive coding step predictively code the succeeding part with an area of predictive coding of each picture of the succeeding part gradually widened with time.

A coding device to which this invention is applicable for coding a digital video signal into a coded signal. The digital video signal is representative of successive pictures. The device includes predictive coding means for predictively coding the digital video signal to produce the coded signal by using correlation between two successive ones of the successive pictures. According to this invention, the device comprises estimating means for estimating a degree of correlation between a current picture and a previous picture to produce an estimated result representative of the degree of correlation, the current picture next succeeding the previous picture among the successive pictures; comparing means for comparing the estimated result with a predetermined threshold value to produce a control signal with reference to a relationship between the estimated result and the predetermined threshold value; and controlling means for controlling the predictive coding means in response to the control signal to separate from the digital video signal a succeeding part beginning at the current picture and to make the predictive coding means predictively code the succeeding part with an area of predictive coding of each picture of the succeeding part gradually widened with time.

DESCRIPTION OF THE PREFERRED EMBODIMENTS

Figure 1:
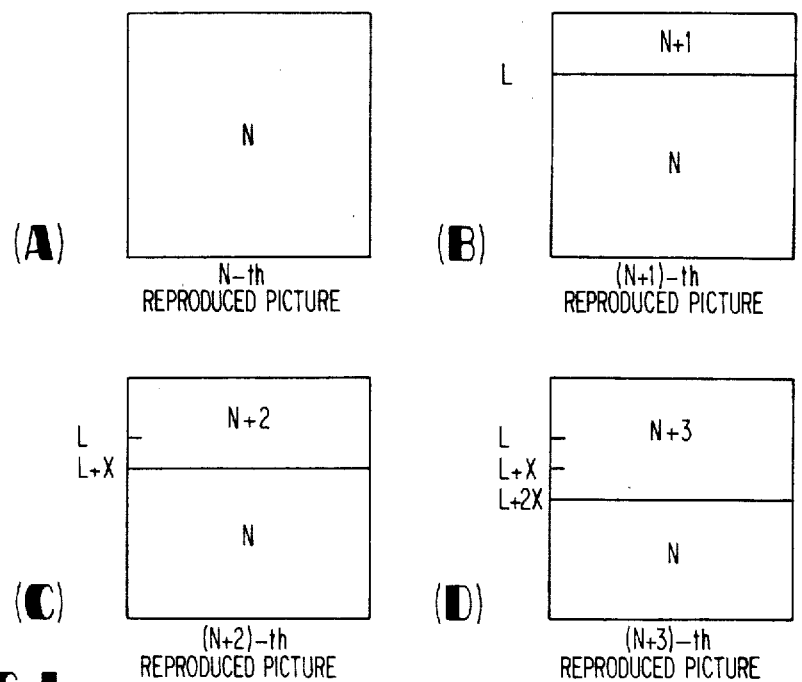
FIGS. 1(A), 1(B), 1(C), and 1(D) exemplify reproduced pictures for use in describing principles of the present invention.

Referring to FIGS. 1(A), 1(B), 1(C), and 1(D), principles of the present invention will be described at first. In the manner described heretobefore, this invention relates to a method and a device for coding a digital video signal into a coded signal by using correlation between two successive pictures which the digital video signal represents. The coded signal is decoded into a decoded signal representative of successive reproduced pictures.

In FIG. 1(A), the N-th reproduced picture is illustrated. In the coding device, predictive coding of an N-th picture is carried out in a time duration of the N-th picture. It is assumed that a drastical change occurs between the N-th picture and an (N+1)-th picture which next succeeds the N-th picture in the digital video signal. The drastical change is assumed to be detected when the (N+1)-th picture is predictively coded up to an L-th scanning line. According to this invention, predictive coding of the (N+1)-th picture is suspended on detection of the drastical change. That is, predictive coding of the (N+1)-th picture is suspended after the L-th scanning line.

As shown in FIG. 1(B), an (N+1)-th reproduced picture therefore has an upper area not lower than the L-th line and a lower area lower than the L-th line. The (N+1)-th picture partially appears in the upper area of the (N+1)-th reproduced picture while the N-th picture remains at the lower area. As to an (N+2)-th picture following the (N+1)-th picture, predictive coding is carried out up to an (L+X)-th scanning line, where X represents a positive integer. Predictive coding is suspended for a remaining part lower than the (L+X)-th line of the (N+2)-th picture.

As shwon in FIG. 1(C), an (N+2)-th reproduced picture therefore has an upper area which is not lower than the (L+X)-th line and which corresponds to an upper portion of the (N+2)-th picture. The (N+2)-th reproduced picture also has a lower area which is lower than the (L+X)-th line and which corresponds to the N-th picture. As regards an (N+3)-th picture succeeding the (N+2)-th picture, predictive coding is carried out up to an (L+2X)-th scanning line. For a remaining part lower than the (L+2X)-th line, predictive coding is suspended.

As shown in FIG. 1(D), an (N+3)-th reproduced picture therefore has an upper portion of the (N+3)-th picture at an upper area which is equal to or higher than the (L+2X)-th line and a lower portion of the N-th picture at a lower area lower than the (L+2X)-th line.

It will now be understood that an area of predictive coding of each picture is gradually widened with time when the drastical change occurs. In accordance with this invention, pictures can be reproduced with a high quality and without occurrence of freezing which is eyesore to viewers even when the drastical change occurs.

Description will now be made as regards a method for detecting the drastical change, such as the scene change, between two successive pictures. It is possible to detect the drastical change by the use of a motion-compensated prediction error produced by a motion-compensated interframe coding method.

Figure 2:
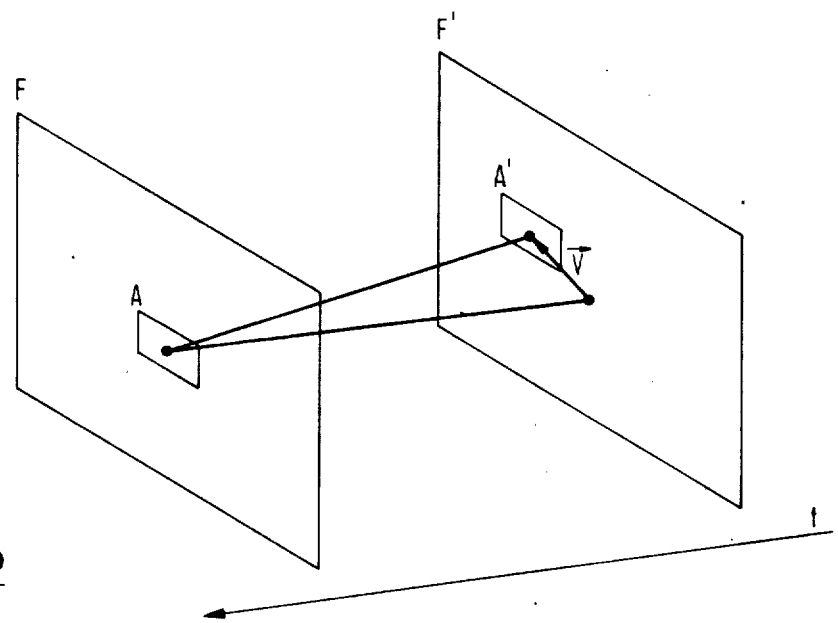
FIG. 2 schematically shows two frames for use in describing a motion-compensated prediction error.

Referring to FIG. 2, the motion-compensated interframe method will at first be described. In the motion-compensated interframe method, each picture is divided into a predetermined number of blocks of picture elements. In FIG. 2, a current picture or frame F next succeeds a previous picture or frame F', both depicted along a time axis t. The previous picture F' is memorized in a frame memory which will later be illustrated. It is assumed that the current picture F has a block A which has a highest correlation with another block A' of the previous picture F'. In order to detect a motion vector V for the block A of the current picture, the other block A' is searched within the previous picture F' in the known manner.

Each of the motion vector and like vectors will be designated merely for ease of print by a usual letter rather than by the letter under a short horizontal arrow which shows a vector quantity. The motion vector V is detected as a displacement from the block A to the other block A' in the current and the previous pictures F and F'. The motion-compensated prediction error corresponds to a difference between two picture elements which are spatially coincident with each other in two blocks connected to each other by the motion vector.

Figure 3:
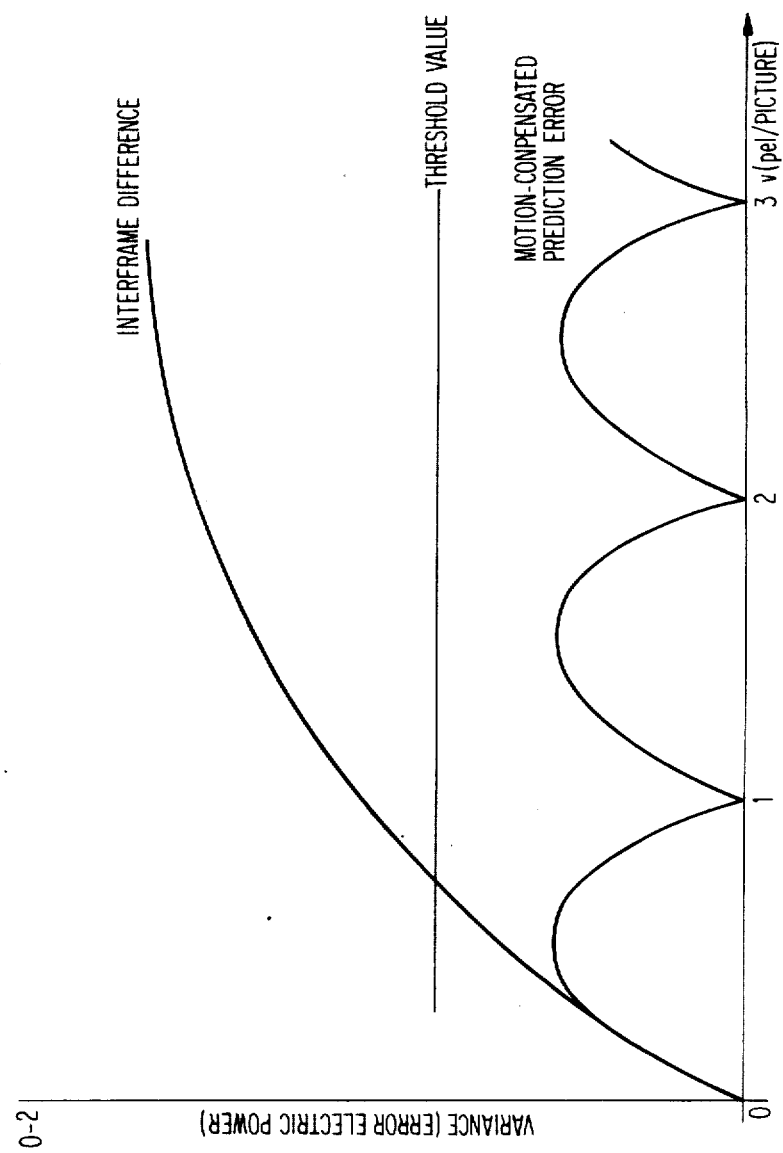
FIG. 3 is a diagram for use in describing a method for detecting a drastical change between two frames.

Referring to FIG. 3, the reason will be described why the drastical change can be detected by the use of the motion-compensated prediction error. As shown in FIG. 3, variances of the motion-compensated prediction error and of an interframe difference between corresponding picture elements of two successive pictures vary in accordance with a velocity (that is, a panning speed) v of a movement of each block between two successive frames. The variance of the interframe difference, designated by $\sigma_{FF}^2$, is represented by Formula (1) hereunder:

$$\sigma_{FF}^2 = 2\sigma_0^2 \cdot \{1 - \exp(-a|v|)\} \qquad (1)$$

where $\sigma_0^2$ represents a mean power for each picture while a represents a parameter corresponding to the complexity of each picture. The variance $\sigma_{FF}^2$ monotonously increases as the velocity of the movement increases. The variance of the motion-compensated prediction error, designated by $\sigma_{MC}^2$, is represented by Formula (2) hereunder:

$$\sigma_{MC}^2 = 2\sigma_0^2 \cdot \{1 - \exp(-a|v - [v]|)\} \qquad (2)$$

where [v] represents an integer part of the velocity v. When the movement becomes equal to a product of a difference between adjacent picture elements and an integer, the variance $\sigma_{MC}^2$ of the motion-compensated prediction error becomes zero as shown in FIG. 3. This is because the motion-compensated prediction is true when the movement becomes equal to the product.

Two successive pictures have no correlation therebetween on occurrence of the scene change. The resultant variances $\sigma_{FF}^2$ and $\sigma_{MC}^2$ become near to an upper limit of the variance $\sigma_{FF}^2$ of the interframe difference illustrated in FIG. 3. Therefore, it is impossible to distinguish the scene change from a high speed moving picture including the movement of a high speed by the use of the interframe difference. In contrast, it is possible to distinguish the scene change from the high speed moving picture by the use of the motion-compensated prediction error. With this fact in mind, judgement is carried out whether or not the variance $\sigma_{MC}^2$ of the motion-compensated prediction error is higher than a predetermined threshold value illustrated in FIG. 3. When the scene change occurs, the variance $\sigma_{MC}^2$ of the motion-compensated prediction error becomes higher than the predetermined threshold value. For the high speed moving picture, the variance $\sigma_{MC}^2$ of the motion-compensated prediction error becomes lower than the predetermined threshold value.

Anyway, a degree of correlation between the current and the previous pictures is evaluated by the variance $\sigma_{MC}^2$ of the motion-compensated prediction error. More specifically, a low degree of correlation is specified by a high value of the variance $\sigma_{MC}^2$ while a high degree of correlation, a low value of the variance $\sigma_{MC}^2$.

Figure 4:
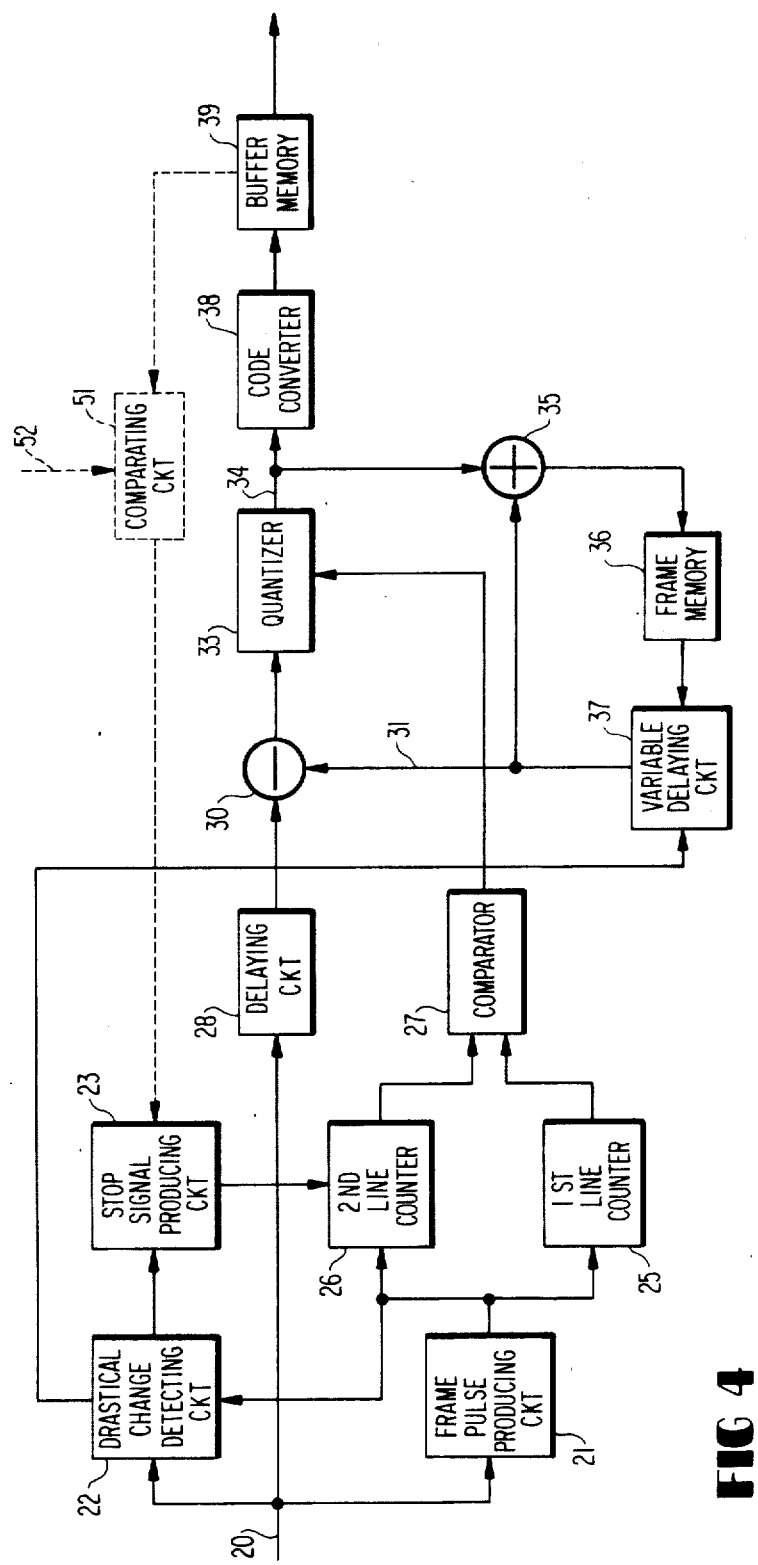
FIG. 4 is a block diagram of a coding device for use in carrying out a method according to a first embodiment of this invention.

Referring to FIG. 4, description will now proceed to a coding device for use in carrying out a method according to a first embodiment of this invention. The coding device is for coding a digital video signal 20 representative of successive pictures.

A frame pulse producing circuit 21 responds to the digital video signal 20 and produces a frame pulse preceding the digital video signal 20 of each frame. For example, the frame pulse takes a logic value "1" at the beginning of each frame and takes a logic "0" level in the remaining part of each frame.

Responsive to the digital video signal 20 and the frame pulse, a drastical change detecting circuit 22 detects a drastical or large change, such as a scene change, between two successive pictures to produce a drastical change detection signal as a control signal, in the manner which will later be described in conjunction with FIG. 5. As will also later be described, the drastical change detecting circuit 22 divides each of the successive pictures into a predetermined number of blocks of picture elements in order to detect a motion vector representative of a movement of each block between two successive pictures. The drastical change detecting circuit 22 produces a signal representative of the motion vector.

For the time being, it may be understood that the drastical change detecting circuit 22 estimates the degree of correlation between the current and the previous pictures by the use of the variance $\sigma_{MC}^2$ in the manner mentioned with reference to FIGS. 2 and 3. As a result, the drastical change detection signal appears when the degree of correlation becomes extremely low.

A stop signal producing circuit 23 produces a stop signal in response to the drastical change detection signal, namely, the control signal.

Responsive to the frame pulse, a first line counter 25 is reset and counted up one by one each time when a time interval for a single scanning line lapses after the first line counter 25 is reset. The first line counter 25 produces a first counted signal representative of a first counted content thereof.

A second line counter 26 carries out usual operation similar to the above-mentioned operation of the first line counter 25. The second line counter 26 produces a second counted signal representative of a second counted content thereof. On reception of the stop signal delivered from the stop signal producing circuit 23, the second line counter 26 stops counting up one by one and retains the counted content as it is until reception of a next succeeding frame pulse. It will be assumed that the second line counter 26 receives the stop signal when the second line counter 26 counts up to an L-th scanning line. In this event, the second line counter 26 retains a number L as the counted content. Whenever a frame pulse is received after reception of the stop signal, the second line counter 26 counts up by a predetermined value which is equal to X illustrated in FIGS. 1(B), 1(C), and 1(D). The second line counter 26 returns to the usual operation after the counted content is either equal to or greater than the number of all scanning lines of one frame.

A comparator 27 compares the first counted signal delivered from the first line counter 25 with the second counted signal delivered from the second line counter 26 and produces a compared result signal. For example, the compared result signal has a logic value "1" when the first counted content is equal to and less than the second counted content. When the first counted content is greater than the second counted content, the compared result signal has another logic value "0."

A delaying circuit 28 delays the digital video signal 20 to produce a delayed video signal. A delay time in the delaying circuit 28 is equal to a delay of a combination circuit consisting of the frame pulse producing circuit 21, the drastical change detecting circuit 22, the stop signal producing circuit 23, the first and the second line counters 25 and 26, and the comparator 27.

A subtractor 30 receives the delayed video signal and a prediction signal 31 which will presently be described. The subtractor 30 carries out subtraction to produce a prediction error which is equal to a difference between the delayed video signal and the prediction signal 31.

Thus, the subtractor 30 is operable as a prediction error producing circuit which is for producing the prediction error.

Responsive to the prediction error and the compared result signal, a quantizer 33 quantizes the prediction error into a quantized error to produce a quantized signal representative of the quantized error when the compared result signal represents the logic value "1." The resultant quantized signal is produced as a coded signal 34. When the compared result signal represents the other logic value "0," the quantizer 33 suspends quantization of the prediction error and produces a nonquantized signal as the coded signal 34. The nonquantized signal is equal to a signal appearing when a prediction error becomes zero.

Responsive to the coded signal 34 and the prediction signal 31, an adder 35 adds the prediction signal 31 to the coded signal 34 to locally decode the coded signal 34 into a local decoded signal. Thus, the adder 35 may be called alocal decoding circuit.

A predictive coder frame memory 36 temporarily memorizes the local decoded signal and produces a first delayed decoded signal having a delay substantially equal to one frame of the local decoded signal. Responsive to the motion vector delviered from the drastical change detecting circuit 22, a variable delaying circuit 37 delays the first decoded delayed signal by a variable delay which is varied in accordance with the movement represented by the motion vector. The variable delaying circuit 37 thereby produces a second delayed decoded signal as the prediction signal 31.

A code converter 38 converts the coded signal 34 into a converted code signal. The converted code signal is formed by codes, each of which is suitable to decrease a transmission rate of the coding device. The code is, for example, the Huffman code known in the art. The converted code signal is sent through a buffer memory 39 to a transmission path at a constant transmission rate.

As mentioned before, a combination of the subtractor 30, the quantizer 33, the adder 35, the frame memory 36, and the variable delaying circuit 37 is operable as a predictive coding arrangement which is for predictively coding the digital video signal 20 to produce the coded signal 34 by using correlation between two successive ones of the successive pictures.

Figure 5:
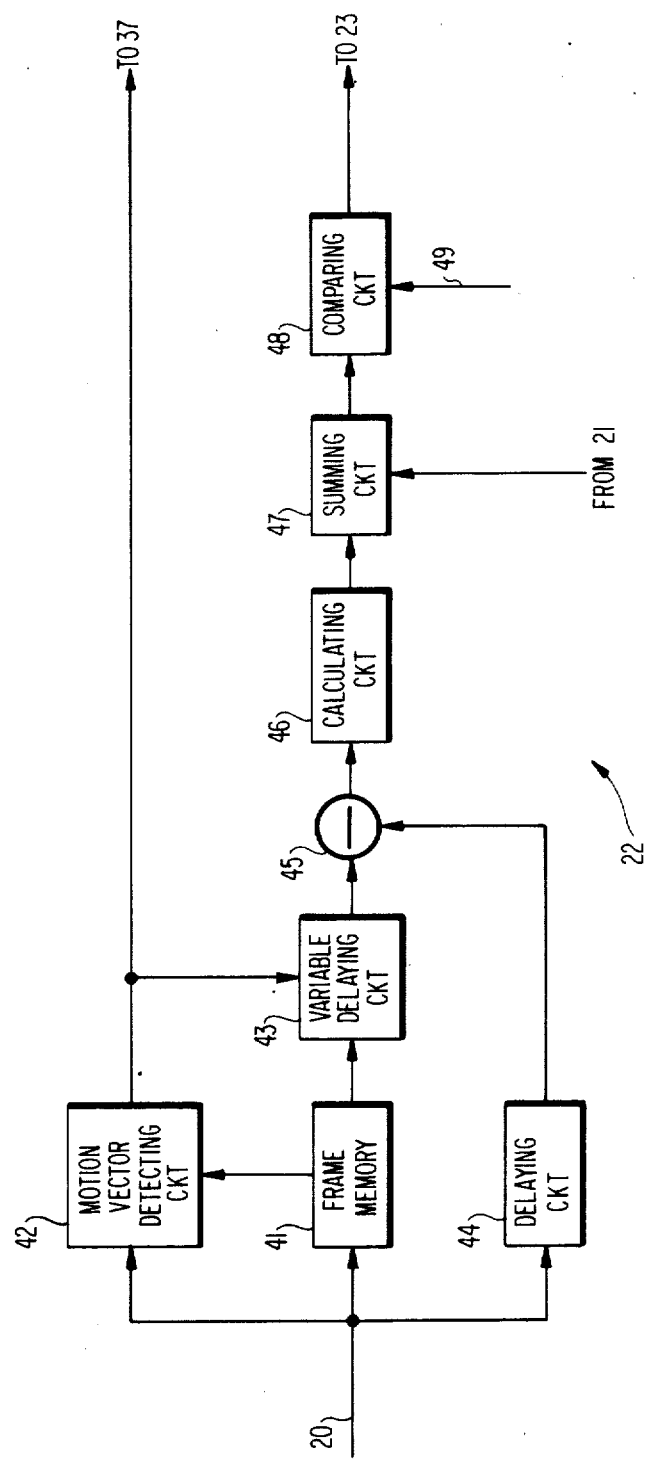
FIG. 5 is a block diagram of a drastical change detecting circuit for use in the coding device illustrated in FIG. 4.

Referring to FIG. 5 together with FIG. 4, the drastical change detecting circuit 22 comprises a detetector frame memory 41 which temporarily memorizes the digital video signal 20. The frame memory 41 produces a delayed video signal having a delay substantially equal to one frame of the digital video signal 20 and a memorized video signal which may be identical with the above-mentioned delayed video signal.

Responsive to the digital video signal 20 and the memorized video signal delivered from the frame memory 41, a motion vector detecting circuit 42 detects the motion vector either for each block or for each picture element of each block in the manner described with reference of FIG. 2 and supplies the motion vector to the variable delaying circuit 27 (FIG. 4). Responsive to the delayed video signal and the motion vector delivered from the motion vector detecting circuit 42, another variable delaying circuit 43 delays the delayed video signal by a variable delay which is varied in accordance with the motion vector to produce a motion-compensated prediction signal.

A delaying circuit 44 delays the digital video signal 20 by a delay in consideration of a delay determined by a combination of the frame memory 41, the motion vector detecting circuit 42, and the variable delaying circuit 43 to produce another delayed video signal. Responsive to the other delayed video signal and the motion-compensated prediction signal, a subtractor 45 carries out subtraction to produce a motion-compensated prediction error. Responsive to the motion-compensated prediction error, a calculating circuit 46 calculates an absolute value of the motion-compensated prediction error to produce the absolute value. Responsive to the absolute value and the frame pulse delivered from the frame pulse producing circuit 21 (FIG. 4), a summing circuit 47 is reset in synchronism with the frame pulse to sum up the absolute values for each frame to produce a summed signal representative of a summed result. The summed signal has a low amplitude when the degree of correlation is strong between two successive pictures. Otherwise, the summed signal has a high amplitude. Thus, the summed signal estimates the degree of correlation and increases as the degree of correlation becomes weak. Accordingly, the summed signal may be referred to as an estimated result signal representative of an estimated result of the degree of correlation.

Responsive to the summed result, a comparing circuit 48 compares the summed result with a predetermined threshold value 49 to produce the drastical or scene change detection signal as the control signal when the summed result is greater than the predetermined threshold value 49. At any rate, the control signal is produced with reference to a relationship between the estimated result and the predetermined threshold value.

Thus, a combination of the frame memory 41, the motion vector detecting circuit 42, the variable delaying circuit 43, the delaying circuit 44, the subtractor 45, the calculating circuit 46, and the summing circuit 47 is operable as an estimating arrangement for estimating the degree of correlation between the successive picture.

Continuing reference to FIG. 5 and again referring to FIG. 4, description will be made as regards the method according to the first embodiment of this invention. As described before, the method is for coding the digital video signal 20 into the coded signal 34. The method includes a predictive coding step of predictively coding the digital video signal 20 to produce the coded signal 34 by using correlation between two successive ones of the successive pictures. The predictive coding step is carried out by the predictive coding arrangement comprising the subtractor 30, the quantizer 33, the adder 35, the frame memory 36, and the variable delaying circuit 37.

According to the method, estimation is carried out as regards a degree of correlation between a current picture and a previous picture represented by the digital video signal 20. The current picture succeeds the previous picture among the successive pictures which the digital video signal 20 represents. The degree of correlation is estimated by the estimating arrangement comprising the frame memory 41, the motion vector detecting circuit 42, the variable delaying circuit 43, the delaying circuit 44, the subtractor 45, the calculating circuit 46, and the summing circuit 47.

The estimated result is compared with a predetermined threshold value by the comparing circuit 48. The comparing circuit 48 produces a control signal, that is, a drastical or scene change detection signal when the estimated result is greater than the predetermined threshold value.

The predictive coding step is controlled in response to the control signal to separate from the digital video signal 20 a succeeding part beginning at the current picture and to predictively code the succeeding part. During the predictive coding step, an area of predictive coding of each picture of the succeeding part is gradually widened with time. Although the succeeding part is herein said to be separated from the digital video signal 20, it is possible to understand that the digital video signal 20 is divided into a signal part representative of the previous picture and the succeeding part. Alternatively, it is possible to understand that the digital video signal 20 is switched to the succeeding part. At any rate, the controlling is carried out by a combination of the stop signal producing circuit 23, the first and the second line counters 25 and 26, and the comparator 27. The combination is operable as a controlling arrangement which is for controlling the predictive coding arrangement in response to the control signal, that is, the drastical change detection signal in the above-mentioned manner.

More particulalry, the controlling arrangement controls the quantizer 33 in response to the control signal to separate the succeeding part from the digital video signal 20. As a result, the quantizer 33 quantizes the prediction error derived from the succeeding part with an area of quantization of each picture of the succeeding part gradually widened with time.

Referring to FIG. 4 once again, a combination of the buffer memory 39 and a comparing circuit 51 may be used instead of the drastical change detecting circuit 22 in order to detect a drastical change, such as a scene change. The buffer memory 39 not only supplies the transmission path with the converted code signal but also supplies the comparing circuit 51 with a state information signal. It is to be noted here that the buffer memory 39 has a predetermined memory capacity. The state information signal is representative of, for example, a ratio of an amount of information memorized in the buffer memory 39 to the memory capacity. It will be understood that the drastical change occurs when the ratio is greater than a predetermined threshold value. This is because the ratio suddenly increases on occurrence of the drastical change. In other words, the ratio is useful for estimating the degree of correlation and increases as the degree of correlation becomes weak. Under the circumstances, the ratio may be called an estimated result of the degree of correlation. Responsive to the state information signal, the comparing circuit 51 compares the ratio with the predetermined threshold value 52 and produces a drastical change detection signal, namely, a control signal when the ratio is greater than the predetermined threshold value 52. The control signal is delivered to the stop signal producing circuit 23 instead of the control signal derived from the drastical change detecting circuit 22.

Thus, the buffer memory 39 is also operable as an estimating arrangement for estimating the degree of correlation. The comparing circuit 51 is operable as a comparing arrangement which is for comparing the estimated result with a predetermined threshold value to produce the control signal with reference to a relationship between the estimated result and the predetermined threshold value.

Figure 6:
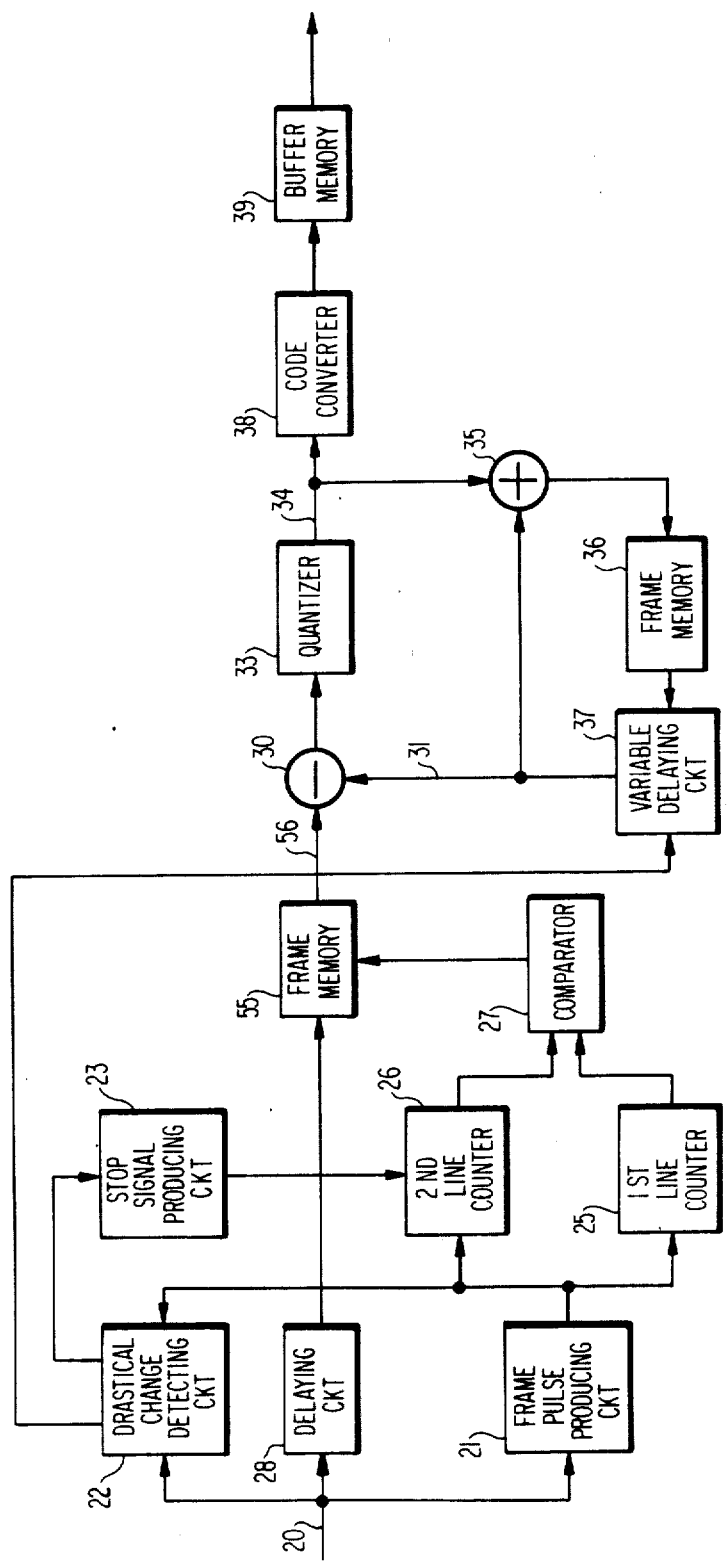
FIG. 6 is a block diagram of a coding device for use in carrying out a method according to a second embodiment of this invention.

Referring to FIG. 6, description will be directed to a coding device for use in carrying out a method according to a second embodiment of this invention. The coding device is similar to that illustrated with reference to FIG. 4 except that a scene change from memory 55 is coupled to the delaying circuit 28, the subtractor 30, and the comparator 27, and that the comparator 27 controls the frame memory 55 instead of the quantizer 33 (FIG. 4).

The frame memory 55 temporarily memorizes a digital video signal delivered from the delaying circuit 28 and produces a delayed signal having a delay equal to one frame of the digital video signal when the compared result signal has the logic value "1." When the compared signal has the other logic value "0," the frame memory 55 suspends memorization of a following digital video signal and keeps a preceding memorized signal intact. The preceding memorized signal is kept without being erased and is successively read out of the frame memory 55 after the delayed signal to be sent through a signal supply line 56 to the subtractor 30. A prediction error is calculated by the subtractor 30 and quantized by the quantizer 33 into a quantized signal for use as the coded signal 34.

As is apparent from the above, a combination of the stop signal producing circuit 23, the first and the second line counters 25 and 26, the comparator 27, and the frame memory 55 is operable as another controlling arrangement which is for controlling the predictive coding arrangement in response to the control signal. Like in FIG. 4, such a controlling arrangement separates from the digital video signal a succeeding part beginning at the current picture and controls the predictive coding arrangement. Consequently, the predictive coding arrangement predictively codes the succeeding part with an area of predictive coding of each picture of the succeeding part gradually widened with time.

The frame memory 55 may be named a temporary memorizing arrangement which is operatively coupled to the comparing arrangement 48 (FIG. 5) and which is for memorizing the digital video signal to produce a delayed signal having a delay equal to one frame of the digital video signal. The temporary memorizing arrangement switches the delayed signal to the succeeding part in response to the control signal. Such switching brings about a gradual increase of an area of each picture of the succeeding part with time like in FIG. 1. The signal supply line 56 is operable as a part which is for supplying the delayed signal and the succeeding part to the predictive coding arrangement to predictively code the delayed signal and the succeeding part into the coded signal 34.

Continuing reference to FIG. 6, the method according to the second embodiment of this invention. The method will be progressive in a manner similar to that described with reference to FIG. 4. However, it is to be noted that a controlling step of controlling the predictive coding is carried out by a controlling arrangement different from that of FIG. 4. More specifically, the controlling arrangement (FIG. 6) carries out a temporarily memorizing step which is for temporarily memorizing the digital video signal in the frame memory 55 to produce the delayed signal. In the temporarily memorizing step, the delayed signal is switched to the succeeding part when the control signal is received by the controlling arrangement. As a result, an area of each picture of the succeeding part is gradually widened with time in the frame memory 55, in a like manner. The delayed signal and the succeeding part are predictively coded into the coded signal 34 by the predictive coding arrangement comprising the subtractor 30, the quantizer 33, the adder 35, the frame memory 36, and the variable delaying circuit 37.

Figure 7:
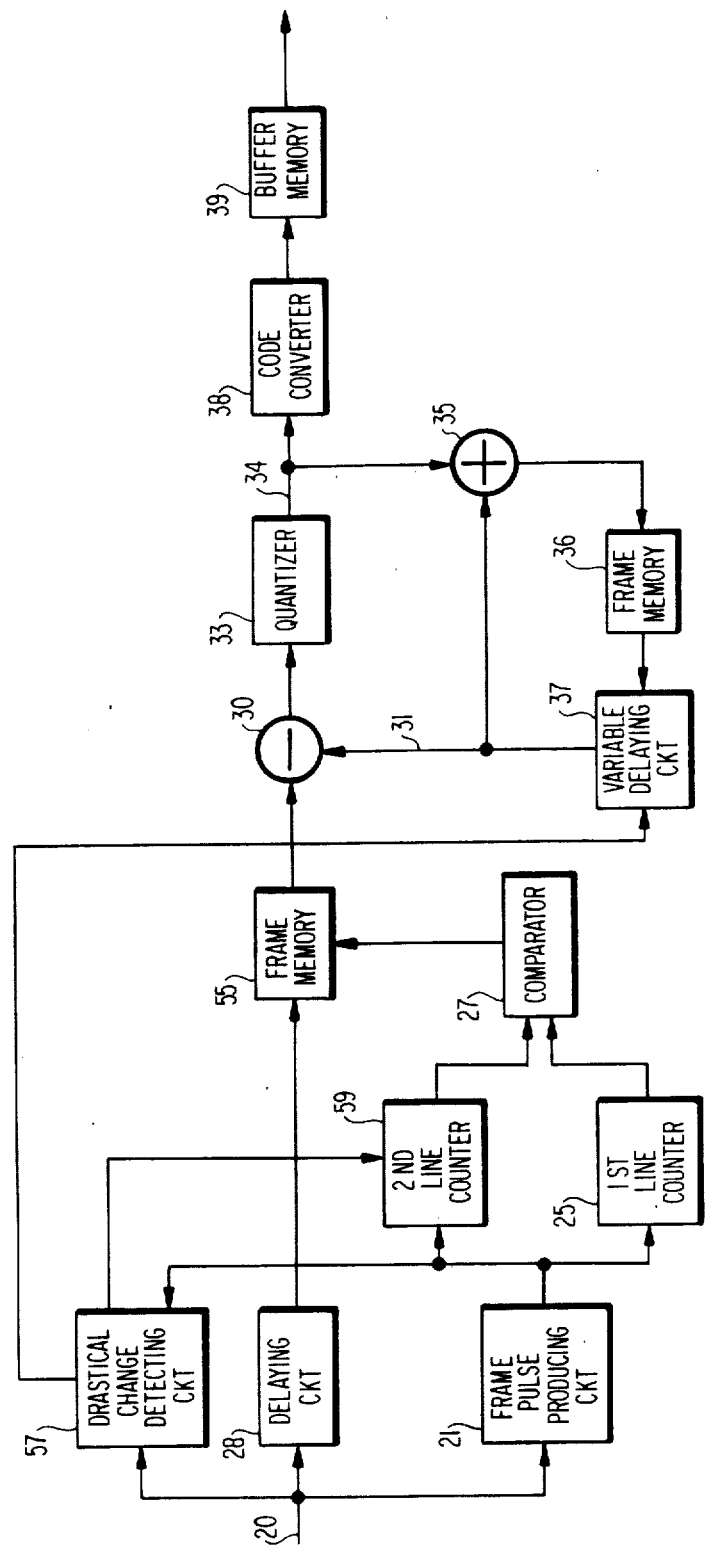
FIG. 7 is a block diagram of a coding device for use in carrying out a method according to a third embodiment of this invention.

Referring to FIG. 7, description will now proceed to a coding device for use in carrying out a method according to a third embodiment of this invention. the coding device is similar to that illlustrated with reference to FIG. 6 except that a drastical change detecting circuit 57 and a second line counter 59 are different in structure and operation from the drastical change detecting circuit 22 and the second line counter 26, respectively, as will later be described. In addition, the second line counter 59 is directly coupled to the drastical change detecting circuit 57 without using the stop signal producing circuit 23 (FIG. 6).

Figure 8:
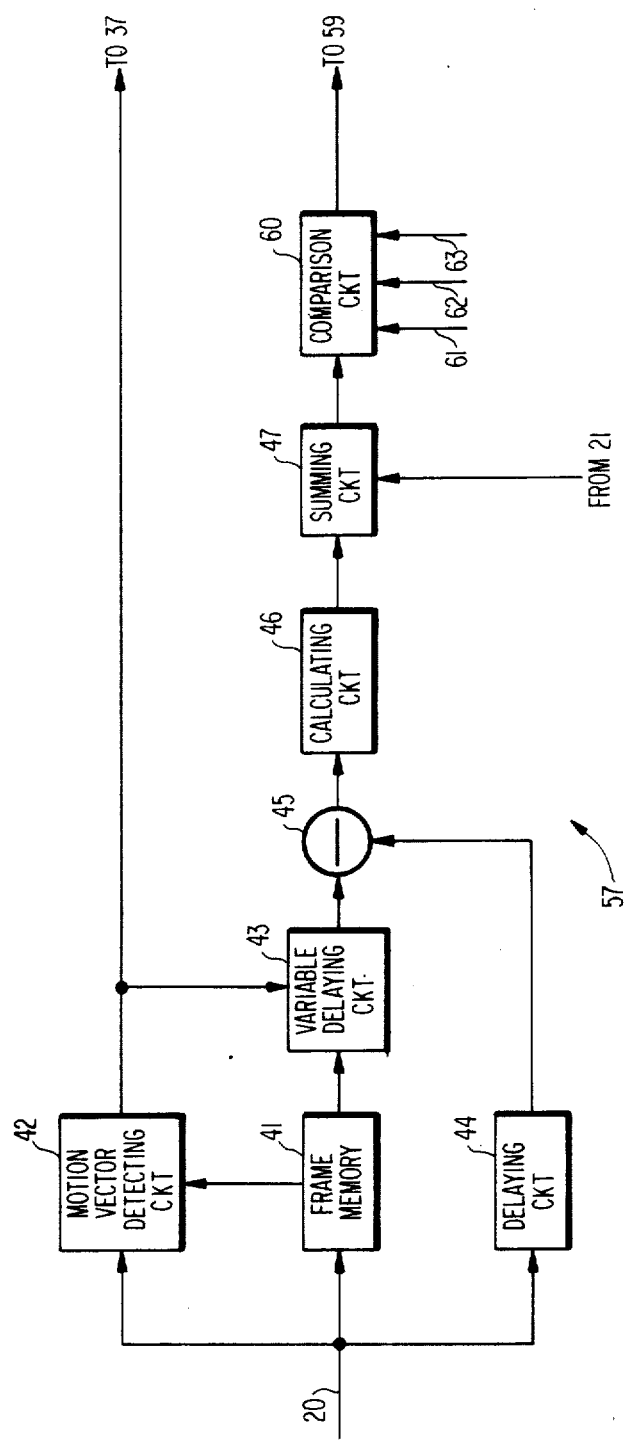
FIG. 8 is a block diagram of another drastical change detecting circuit for use in the coding device illustrated in FIG. 7.

Referring to FIG. 8, the drastical change detecting circuit 57 is similar to that illustrated with reference to FIG. 5 except that a comparison circuit 60 is used instead of the comparing circuit 48. The comparison circuit 60 is supplied with first, second, and third local threshold values 61, 62, and 63 which may be collectively referred to as the predetermined threshold value 49 (FIG. 5).

Figure 9:
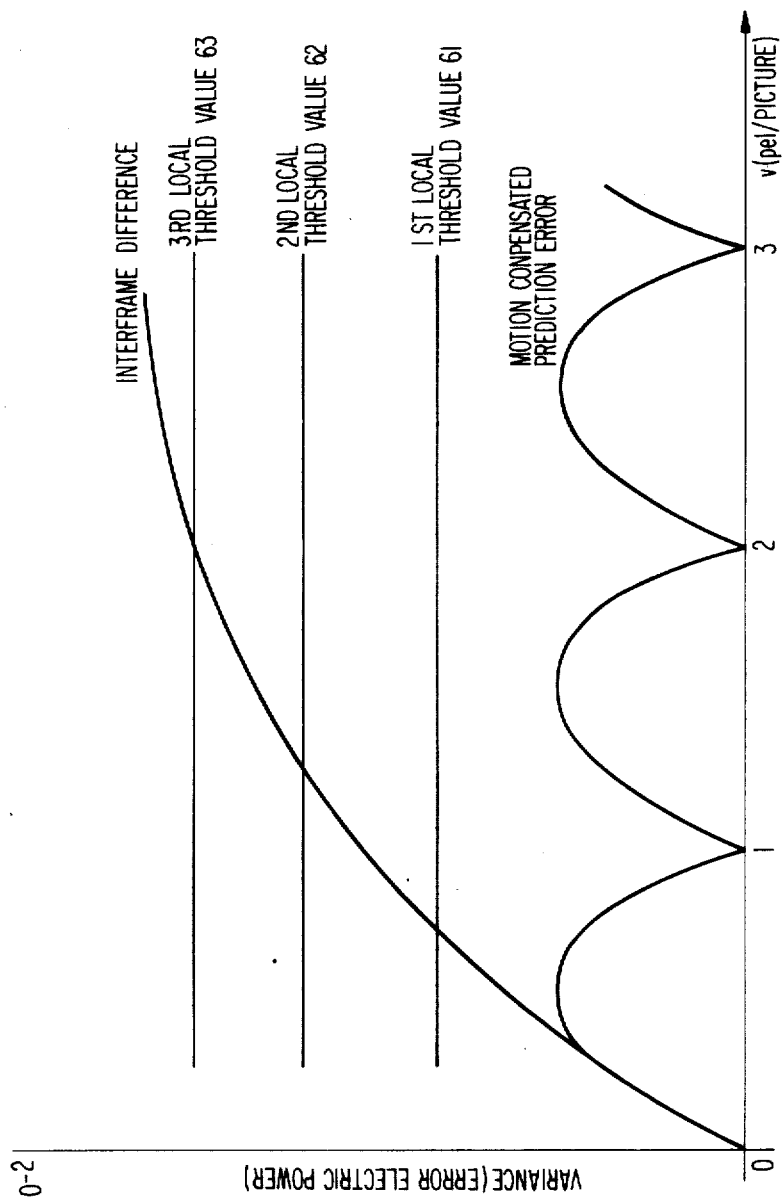
FIG. 9 is another diagram for use in describing a method for detecting a drastical change.

Temporarily referring to FIG. 9, the first through third local threshold values 61 to 63 are selected so that the second local threshold value 62 is greater than the first local threshold value 61 and smaller than the third local threshold value 63.

Referring back to FIG. 8, the comparison circuit 60 is responsive to the summed result delivered from the summing circuit 47 and compares the summed result with the first, the second, and the third local threshold values 61, 62, and 63. The comparison circuit 60 supplies the second line counter 59 with a first local control signal of, for example, a code "1" as the control signal when the summed result is greater than the first local threshold values 61 and is not greater than the second local threshold value 62. When the summed result is greater than the second local threshold value 62 and is not greater than the third local threshold value 63, a second local control signal of, for example, a code "2" is delivered as the control signal by the comparison circuit 60 to the second line counter 59. When the summed result is greater than the third local threshold value 63, the comparison circuit 60 supplies a third local control signal of, for example, a code "3" as the control signal to the second line counter 59.

Referring back to FIG. 7, description will be made as regards the second line counter 59. The second line coutner 59 carries out usual operation similar to the above-mentioned operation of the first line counter 25 and produces a second counted signal representative of a second counted content thereof. On reception of any one of the first, the second, and the third local control signal, the second line counter 59 stops counting and retains the counted content as it is until reception of a next succeeding frame pulse.

It will be assumed that the second line counter 59 receives the first local control signal. In this event, the second line counter 59 counts up so that second counted content increases by a first predetermined value equal to 3X whenever a frame pulse is recieved after reception of the first local control signal. Similarly, the second line counter 59 counts up by a second predetermined value equal to 2X whenever a frame pulse is received after reception of the second local control signal. Likewise, the second counter 59 counts up by a third predetermined value equal to X whenever a frame pulse is received after reception of the third local control signal. The second line counter 26 returns to the usual operation after the counted content becomes either equal to or greater than the number of all scanning lines of one frame.

Again referring to FIG. 8, the comparison circuit 60 is thus operable to compare the summed result, namely, the estimated result with the first through third local threshold values. It may readily be seen that the estimated result may be compared with two different local threshold values alone. In this event, only two local control signals are produced with reference to the relationship between the estimated result and the two different local threshold values.

Referring back to FIGS. 7 and 8, a combination of the first and the second line counters 25 and 59, the comparator 27, and the frame memory 55 is operable as a controlling arrangement which is for controlling the predictive coding arrangement in response to either of the first through third local control signals in a manner as mentioned before. It is to be noted that an area of predictive coding of each picture of the succeeding part is widened at first through third rates determined in relation to the first through third local control signals, respectively. Thus, each of the first through third rates is different from one another and defines speed of scene shifts, namely, a rate of increase of the area from one scene to aonother. If such scene shifts are completed about one second, the scene shifts may look like a falling curtain without any sense of incongruity.

As is readily understood from the above, the method according to the third embodiment of this invention is started by comparing the estimated result with the first through third local threshold values and completed by controlling the predictive coding by the use of either one of the first through third local control signals with reference to a result of comparison.

Figure 10:
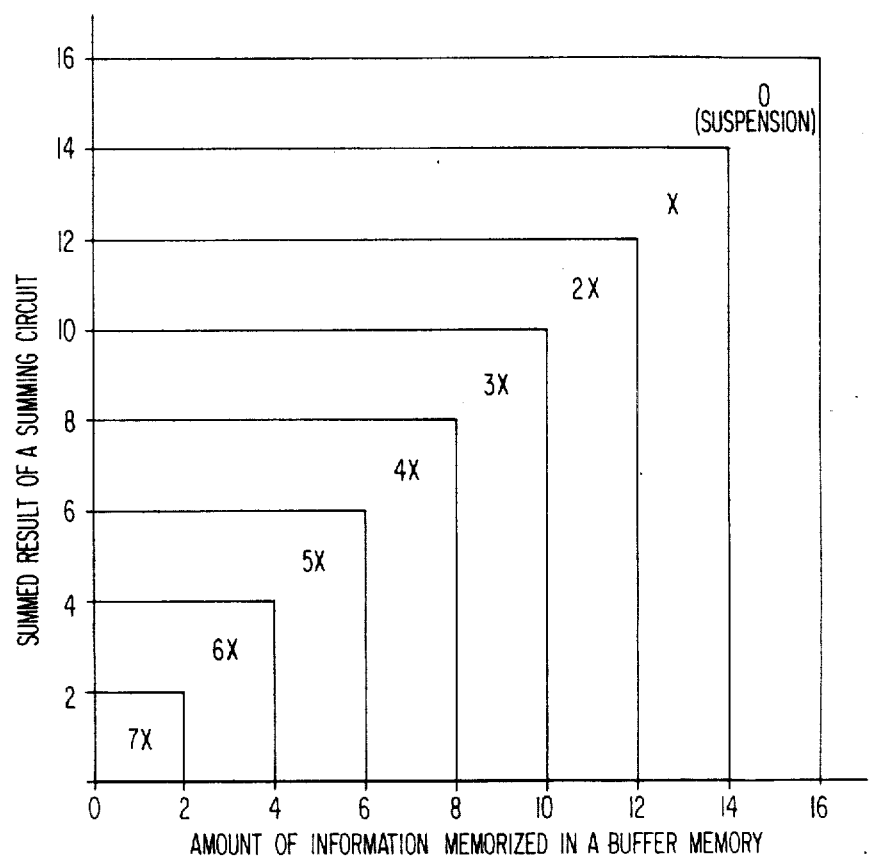
FIG. 10 is a diagram for use in describing relation among the number of lines increased for each picture, a summed result of a summing circuit, and an amount of information memorized in a buffer merory.

Referring to FIG. 10 together with FIGS. 4 and 8, description will be made as regards relation among the number of scanning lines increased for each picture, the summed result of the summing circuit 47, and the amount of information memorized in the buffer memory 51. As is apparent from FIG. 10, the number of the lines increases for each picture as the summed result or the amount of memorized information decreases. That is, the number of the lines increases for each picture as the degree of correlation increases between the current and the previous pictures.

While the present invention has thus far been described in conjunction with preferred embodiments thereof, it will now be readily possible for those skilled in the art to put this invention into practice in various other manners. For example, the calculating circuit 46 may be a different calculating circuit for calculating a square of the motion-compensated predictive error.

What is claimed is:

1. A method of coding a digital video signal into a coded signal, said digital video signal being representative of successive pictures, said method including a predictive coding step of predictively coding said digital video signal to produce said coded signal by using correlation between two successive ones of said suucessive pictures, wherein the improvement comprises the steps of:

estimating a degree of correlation between a current picture and a previous picture to produce an estimated result representative of said degree of correlation, said current picture next succeeding said previous picture among said successive pictures;

comparing said estimated result with a predetermined threshold value to produce a control signal with reference to a relationship between said estimated result and said predetermined threshold value; and controlling said predictive coding step in response to said control signal to separate from said digital video signal a succeeding part beginning at said current picture and to make said predictive coding step predictively code said succeeding part with an area of predictive coding of each picture of said succeeding part gradually widened with time.

2. A method as claimed in claim 1, said predictive coding step comprising the steps of: producing a prediction error equal to a difference between said digital video signal and a prediction signal; quantizing said prediction error into a quantized signal for use as said coded signal; locally decoding said coded signal into a local decoded signal in response to said prediction signal; processing said local decoded signal into said prediction signal; wherein said controlling step is for controlling said quantizing step in response to said control signal to separate said succeeding part from said digital video signal and to make said quantizing step quantize the prediction error derived from said succeeding part with an area of quantization of each picture of said succeeding part gradually widened with time.

3. A method as claimed in claim 1, wherein said controlling step comprises the steps of:

temporarily memorizing said digital video signal to produce a delayed signal having a delay equal to one frame of said digital video signal, said temporarily memorizing step being furthermore for switching said delayed signal to said succeeding part in response to said control signal with an area of each picture of said succeeding part gradually widened with time; and making said predictive coding step predictively code said delayed signal and said succeeding part into said coded signal.

4. A method as claimed in claim 1, said estimated result increasing as said degree of correlation becomes weak, said predetermined threshold value comprising a first and a second local threshold value, said second local threshold value being greater than said first local threshold value, wherein said comparing step is for comparing said estimated result with said first and said second local threshold values to produce a first local control signal when said estimated result is greater than said first local threshold value and is not greater than said second local threshold value and to produce a second local control signal when said estimated result is greater than said second local threshold value.

5. A method as claimed in claim 4, wherein said controlling step is for controlling said predictive coding step in response to either of said first and said second local control signals to separate said succeeding part from said digital video signal and to make said predictive coding step predictively code said succeeding part with an area of predictive coding of each picture of said succeeding part widened at a first and a second rate when said succeeding part is separated in response to said first and said second local control signals, respectively, each of said first and said second rates defining a rate of increase of said area, said second rate being less than said first rate.

6. A coding device for coding a digital video signal into a coded signal, said digital video signal being representative of successive pictures, said device including predictive coding means for predictively coding said digital video signal to produce said coded signal by using correlation between two successive ones of said successive pictures, wherein the improvement comprises:

estimating emans for estimating a degree of correslation between a current picture and a previous picture to produce an estimated result representative of said degree of correlation, said current picture next succeeding said previous picture among said successive pictures;

comparing means for comparing said estimated result with a predetermined threshold value to produce a control signal with reference to a relationship between said estimated result and said predetermined threshold value; and controlling means for controlling said predictive coding means in response to said control signal to separate from said digital video signal a succeeding part beginning at said current picture and to make said predictive coding means predictively code said succeeding part with an area of predictive coding of each picture of said succeeding part gradually widened with time.

7. A coding device as claimed in claim 6, said predictive coding means comprising: prediction error producing means for producing a prediction error equal to a difference between said digital video signal and a prediction signal; quantizing means for quantizing said prediction error into a quantized signal for use ascsaid coded signal; local decoding means responsive to said prediction signal and said coded signal for locally decoding said coded signal into a local decoded signal; processing means for processing said local decoded signal into said prediction signal; wherein said controlling means is for controlling said quantizing means in response to said control signal to separate said succeeding part from said digital video signal and to make said quantizing means quantize the predictive error derived from said succeeding part with an area of quantization of each picture of said succeeding part gradually widened with time.

8. A coding device as claimed in claim 6, wherein said controlling means comprises:

temporary memorizing means coupled to said comparing means for memorizing said digital video signal to produce a delayed signal having a delay equal to one frame of said digital video signal, said temporary memorizing means switching said delayed signal to said succeeding part in response to said control signal with an area of each picture of said succeeding part gradually widened with time; and means for supplying said delayed signal and said succeeding part to said predictive coding means to predictively code said delayed signal and said succeeding part into said coded signal.

9. A coding device as claimed in claim 6, said estimated result increasing as said degree of correlation becomes weak, said predetermined threshold value comprising a first and a second local threshold value, said second local threshold value being greater than said first local threshold value, wherein said comparing means is for comparing said estimated result with said first and said second local threshold values to produce a first local control signal when said estimated result is greater than said first local threshold value and is not greater than said second local threshold value and to produce a second local control signal when said estimated result is greater than said second local threshold value.

10. A coding device as claimed in claim 9, wherein said controlling means is for controlling said predictive coding means in response to either of said first and said second local control signals to separate said succeeding part from said digital video signal and to make said predictive coding means predictively code said succeeding part with an area of predictive coding of each picture of said succeeding part widened at a first and a second rate when said succeeding part is separated in response to said first and said second local control signals, respectively, each of said first and said second rates defining a rate of increase of said area, said second rate being less than said first rate.

* * * * *

UNITED STATES PATENT AND TRADEMARK OFFICE
CERTIFICATE OF CORRECTION

PATENT NO. : 4,689,672
DATED : August 25, 1987
INVENTOR(S) : Akihiro Furukawa; Junichi Ohki It is certified that error appears in the above-identified patent and that said Letters Patent is hereby corrected as shown below:

Column 7, line 60, after "circuit" delete "27" and insert therefor --37--.

Column 14, line 9, delete "emans" and insert therefor --means-- and delete "correslation" and insert therefor --correlation--.

Column 14, line 33, delete "ascsaid" and insert therefor --as said--.

Signed and Sealed this

Fifth Day of July, 1988

*Attest:*

DONALD J. QUIGG

*Attesting Officer*  *Commissioner of Patents and Trademarks*